US012750822B2

(12) United States Patent
Ji et al.

(10) Patent No.: US 12,750,822 B2
(45) Date of Patent: Sep. 29, 2026

(54) METHOD FOR DETERMINING TRANSPORT BLOCK SIZE AND APPARATUS

(71) Applicant: HUAWEI TECHNOLOGIES CO., LTD., Shenzhen (CN)

(72) Inventors: Liuliu Ji, Shanghai (CN); Haicun Hang, Shanghai (CN); Hongzhe Shi, Shenzhen (CN); Xiang Ren, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 549 days.

(21) Appl. No.: 17/675,807

(22) Filed: Feb. 18, 2022

(65) Prior Publication Data

US 2022/0174653 A1 Jun. 2, 2022

Related U.S. Application Data

(63) Continuation of application No. PCT/CN2020/110284, filed on Aug. 20, 2020.

(30) Foreign Application Priority Data

Aug. 20, 2019 (CN) ......................... 201910770515.2

(51) Int. Cl.
*H04W 72/04* (2023.01)
*H04L 1/06* (2006.01)
(Continued)

(52) U.S. Cl.
CPC ............. *H04W 72/044* (2013.01); *H04L 1/08* (2013.01); *H04L 1/0006* (2013.01); *H04L 27/2626* (2013.01)

(58) Field of Classification Search
CPC ..... H04W 72/044; H04W 8/24; H04W 24/02; H04W 72/0446; H04W 72/0453;
(Continued)

(56) References Cited

U.S. PATENT DOCUMENTS

2014/0126551 A1 5/2014 Nammi et al.
2017/0026297 A1 * 1/2017 Sun ...................... H04B 7/0623
(Continued)

FOREIGN PATENT DOCUMENTS

CN 104380642 A 2/2015
CN 105472528 A 4/2016
(Continued)

OTHER PUBLICATIONS

3GPP TS 38.211 V15.6.0 (Jun. 2019), "3rd Generation Partnership Project; Technical Specification Group Radio Access Network; NR; Physical channels and modulation (Release 15)," Jun. 2019, 97 pages.

(Continued)

*Primary Examiner* — Faruk Hamza
*Assistant Examiner* — Aixa A Guadalupe Cruz
(74) *Attorney, Agent, or Firm* — Fish & Richardson P.C.

(57) ABSTRACT

Example methods and apparatus for determining a transport block size are described. One example method includes determining a transport block size (TBS) of a first transport block by a communications apparatus. The communications apparatus determines a TBS of a second transport block based on the TBS of the first transport block, where the first transport block is different from the second transport block, the TBS of the second transport block is equal to the TBS of the first transport block, and a data channel carrying the first transport block and a data channel carrying the second transport block occupy a same time domain resource.

20 Claims, 5 Drawing Sheets

(51) Int. Cl.

| | |
|---|---|
| ***H04L 1/08*** | (2006.01) |
| ***H04L 27/26*** | (2006.01) |
| ***H04W 72/044*** | (2023.01) |
| *H04L 1/00* | (2006.01) |

(58) Field of Classification Search
CPC ........ H04W 72/51; H04W 72/23; H04L 1/08; H04L 1/0009; H04L 1/06; H04L 5/001; H04L 2001/0092; H04L 5/0005; H04L 5/0044; H04L 1/0013; H04L 1/0027; H04B 7/0628; H04B 7/0639
See application file for complete search history.

(56) References Cited

U.S. PATENT DOCUMENTS

| | | | | |
|---|---|---|---|---|
| 2018/0035409 | A1 | 2/2018 | Chmiel et al. | |
| 2019/0320420 | A1 * | 10/2019 | Zhang | H04W 72/23 |
| 2020/0195372 | A1 * | 6/2020 | Rico Alvarino | H04L 1/0005 |
| 2022/0022233 | A1 * | 1/2022 | Lee | H04L 1/0016 |
| 2022/0217686 | A1 * | 7/2022 | Matsumura | H04B 7/0695 |

FOREIGN PATENT DOCUMENTS

| | | | |
|---|---|---|---|
| CN | 107046453 | A | 8/2017 |
| CN | 109150403 | A | 1/2019 |
| CN | 109314968 | A | 2/2019 |
| CN | 109803426 | A | 5/2019 |
| CN | 110034864 | A | 7/2019 |
| CN | 112423313 | B | 4/2022 |
| WO | 2017171202 | A1 | 10/2017 |
| WO | 2018152791 | A1 | 8/2018 |
| WO | 2019137500 | A1 | 7/2019 |

OTHER PUBLICATIONS

3GPP TS 38.212 V15.6.0 (Jun. 2019), "3rd Generation Partnership Project; Technical Specification Group Radio Access Network; NR; Multiplexing and channel coding (Release 15)," Jun. 2019, 101 pages.

3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.

3GPP TS 38.214 V15.6.0 (Jun. 2019), "3rd Generation Partnership Project; Technical Specification Group Radio Access Network; NR; Physical layer procedures for data (Release 15)," Jun. 2019, 105 pages.

3GPP TS 38.321 V15.6.0 (Jun. 2019), "3rd Generation Partnership Project; Technical Specification Group Radio Access Network; NR; Medium Access Control (MAC) protocol specification (Release 15)," Jun. 2019, 78 pages.

Chairman, "Draft Agenda," 3GPP TSG RAN WG1 #96, R1-1901480, Athens, Greece, Feb. 25-Mar. 1, 2019, 7 pages.

Huawei, HiSilicon, "Enhancements on Multi-TRP/panel transmission," 3GPP TSG RAN WG1 Meeting #96bis, R1-1905523, Xi'an, China, Apr. 8-12, 2019, 22 pages.

Office Action issued in Chinese Application No. 201910770515.2 on Sep. 26, 2021, 17 pages (with English translation).

PCT International Search Report and Written Opinion issued in International Application No. PCT/CN2020/110284 on Nov. 24, 2020, 15 pages (with English translation).

Samsung, "Enhancements on Multi-TRP/Panel Transmission," 3GPP TSG RAN WG1 Meeting #97, R1-1906968, Reno, USA, May 13-17, 2019, 11 pages.

Vivo, "Discussion on mode 1 resource allocation mechanism," 3GPP TSG RAN WG1 #97, R1-1906138, Reno, USA, May 13-17, 2019, 13 pages.

Extended European Search Report issued in European Application No. 20854200.1 on Sep. 15, 2022, 9 pages.

* cited by examiner

METHOD FOR DETERMINING TRANSPORT BLOCK SIZE AND APPARATUS

CROSS-REFERENCE TO RELATED APPLICATIONS

This application is a continuation of International Application No. PCT/CN2020/110284, filed on Aug. 20, 2020, which claims priority to Chinese Patent Application No. 201910770515.2, filed on Aug. 20, 2019. The disclosures of the aforementioned applications are hereby incorporated by reference in their entireties.

TECHNICAL FIELD

This application relates to the field of communications technologies, and in particular, to a method for determining a transport block size (transport block size, TBS) and an apparatus.

BACKGROUND

With rapid development of mobile communications technologies, a communications system has a higher requirement for reliability. An ultra-reliable low-latency communication (ultra-reliable low-latency communication, URLLC) service in a 5th generation (5th-generation, 5G) system is used as an example, and reliability required by the URLLC service is up to 99.999%. To improve reliability, the communications system may transmit downlink data in a coordinated multi-transmission reception point (transmission reception point, TRP) transmission manner. That is, each of a plurality of TRPs sends a transport block to a terminal, and the transport blocks sent by the plurality of TRPs come from a same data block. The terminal can combine and demodulate the plurality of received transport blocks, to obtain a relatively large combination gain, thereby ensuring robustness of data transmission. Currently, in some scenarios, the terminal cannot combine and demodulate a plurality of transport blocks, affecting robustness of data transmission.

SUMMARY

This application provides a method for determining a TBS and an apparatus, to ensure that a terminal can combine and demodulate a plurality of transport blocks, thereby ensuring robustness of data transmission.

According to a first aspect, a method for determining a TBS is provided, including: a communications apparatus determines a TBS of a first transport block; and the communications apparatus determines a TBS of a second transport block based on the TBS of the first transport block, where the first transport block is different from the second transport block, the TBS of the second transport block is equal to the TBS of the first transport block, and a data channel carrying the first transport block and a data channel carrying the second transport block occupy a same time domain resource.

Based on the foregoing technical solution, the communications apparatus determines the TBS of the second transport block by using the TBS of the first transport block. Therefore, the TBS of the first transport block is equal to the TBS of the second transport block. This can ensure that the terminal can combine and demodulate the first transport block and the second transport block, to obtain a corresponding combination gain, thereby ensuring robustness of data transmission.

In a possible design, a quantity of time-frequency elements corresponding to the first transport block is smaller than a quantity of time-frequency elements corresponding to the second transport block; or a quantity of time-frequency elements corresponding to the first transport block is larger than a quantity of time-frequency elements corresponding to the second transport block; or an index value of a transmission configuration indication (transmission configuration indication, TCI) state (state) associated with the data channel carrying the first transport block is smaller than an index value of a TCI state associated with the data channel carrying the second transport block; or an index value of a TCI state associated with the data channel carrying the first transport block is larger than an index value of a TCI state associated with the data channel carrying the second transport block; or a frequency of a frequency domain resource occupied by the first transport block is higher than a frequency of a frequency domain resource occupied by the second transport block; or a frequency of a frequency domain resource occupied by the first transport block is lower than a frequency of a frequency domain resource occupied by the second transport block; or the first transport block corresponds to a target redundancy version (redundancy version, RV).

In a possible design, a bit rate corresponding to the second transport block is determined based on the TBS of the first transport block, the quantity of time-frequency elements of the second transport block, and a modulation and coding scheme (modulation and coding scheme, MCS) corresponding to the second transport block.

In a possible design, a quantity of information bits corresponding to the first transport block is equal to a quantity of information bits corresponding to the second transport block.

In a possible design, if the quantity of time-frequency elements corresponding to the first transport block is smaller than the quantity of time-frequency elements corresponding to the second transport block, a rate matching manner corresponding to the first transport block is puncturing, and/or a rate matching manner corresponding to the second transport block is repeating; or, if the quantity of time-frequency elements corresponding to the first transport block is larger than a quantity of time-frequency resources corresponding to the second transport block, a rate matching manner corresponding to the first transport block is repeating, and/or a rate matching manner corresponding to the second transport block is puncturing.

In a possible design, the quantity of information bits corresponding to the first transport block is not equal to the quantity of information bits corresponding to the second transport block.

In a possible design, if the quantity of information bits corresponding to the first transport block is larger than the quantity of information bits corresponding to the second transport block, the first transport block corresponds to a first RV, the second transport block corresponds to a second RV, and the first RV is different from the second RV. Alternatively, if the quantity of information bits corresponding to the first transport block is smaller than the quantity of information bits corresponding to the second transport block, the first transport block corresponds to the second RV, and the second transport block corresponds to the first RV. A version number of the first RV is larger than a version number of the second RV. In this way, the terminal may receive more system bits by receiving the first transport block and the second transport block.

In a possible design, the quantity of information bits is an intermediate quantity of information bits or a quantized intermediate quantity of information bits.

In a possible design, if the communications apparatus is a terminal, the method further includes: the terminal sends capability indication information to a network device, where the capability indication information is used to indicate whether the terminal has a soft combination capability, and the soft combination capability is a capability of combining and demodulating a plurality of pieces of data received on a same time domain resource. In this way, the network device may learn whether the terminal has the soft combination capability.

In a possible design, if the communications apparatus is a network device, the method further includes: the network device receives capability indication information from a terminal, where the capability indication information is used to indicate whether the terminal has a soft combination capability, and the soft combination capability is a capability of combining and demodulating a plurality of pieces of data received on a same time domain resource. In this way, the network device may learn whether the terminal has the soft combination capability.

In a possible design, that the capability indication information is used to indicate whether the terminal has a soft combination capability includes: the capability indication information is used to indicate whether the terminal has the soft combination capability on system bandwidth or an active bandwidth part (bandwidth part, BWP).

In a possible design, when the capability indication information is used to indicate that the terminal has the soft combination capability, the capability indication information includes frequency domain resource information, and the frequency domain resource information is used to indicate a frequency domain resource that supports the soft combination capability of the terminal.

According to a second aspect, a communications apparatus is provided, including a first determining module and a second determining module. The first determining module is configured to determine a TBS of a first transport block. The second determining module is configured to determine a TBS of a second transport block based on the TBS of the first transport block, where the first transport block is different from the second transport block, the TBS of the second transport block is equal to the TBS of the first transport block, and a data channel carrying the first transport block and a data channel carrying the second transport block occupy a same time domain resource.

In a possible design, a quantity of time-frequency elements corresponding to the first transport block is smaller than a quantity of time-frequency elements corresponding to the second transport block; or a quantity of time-frequency elements corresponding to the first transport block is larger than a quantity of time-frequency elements corresponding to the second transport block; or an index value of a TCI state associated with the data channel carrying the first transport block is smaller than an index value of a TCI state associated with the data channel carrying the second transport block; or an index value of a TCI state associated with the data channel carrying the first transport block is larger than an index value of a TCI state associated with the data channel carrying the second transport block; or a frequency of a frequency domain resource occupied by the first transport block is higher than a frequency of a frequency domain resource occupied by the second transport block; or a frequency of a frequency domain resource occupied by the first transport block is lower than a frequency of a frequency domain resource occupied by the second transport block; or the first transport block corresponds to a target RV.

In a possible design, a bit rate corresponding to the second transport block is determined based on the TBS of the first transport block, the quantity of time-frequency elements of the second transport block, and an MCS corresponding to the second transport block.

In a possible design, a quantity of information bits corresponding to the first transport block is equal to a quantity of information bits corresponding to the second transport block.

In a possible design, if the quantity of time-frequency elements corresponding to the first transport block is smaller than the quantity of time-frequency elements corresponding to the second transport block, a rate matching manner corresponding to the first transport block is puncturing, and/or a rate matching manner corresponding to the second transport block is repeating. Alternatively, if the quantity of time-frequency elements corresponding to the first transport block is larger than a quantity of time-frequency resources corresponding to the second transport block, a rate matching manner corresponding to the first transport block is repeating, and/or a rate matching manner corresponding to the second transport block is puncturing.

In a possible design, the quantity of information bits corresponding to the first transport block is not equal to the quantity of information bits corresponding to the second transport block.

In a possible design, if the quantity of information bits corresponding to the first transport block is larger than the quantity of information bits corresponding to the second transport block, the first transport block corresponds to a first RV, the second transport block corresponds to a second RV, and the first RV is different from the second RV. Alternatively, if the quantity of information bits corresponding to the first transport block is smaller than the quantity of information bits corresponding to the second transport block, the first transport block corresponds to a second RV, and the second transport block corresponds to a first RV.

In a possible design, a version number of the first RV is larger than a version number of the second RV.

In a possible design, the quantity of information bits is an intermediate quantity of information bits or a quantized intermediate quantity of information bits.

In a possible design, the communications apparatus further includes a communications module; and the communications module is configured to: when the communications apparatus is a terminal, send capability indication information to a network device, where the capability indication information is used to indicate whether the terminal has a soft combination capability, and the soft combination capability is a capability of combining and demodulating a plurality of pieces of data received on a same time domain resource.

In a possible design, the communications apparatus further includes a communications module; and the communications module is configured to: when the communications apparatus is a network device, receive capability indication information from a terminal, where the capability indication information is used to indicate whether the terminal has a soft combination capability, and the soft combination capability is a capability of combining and demodulating a plurality of pieces of data received on a same time domain resource.

In a possible design, that the capability indication information is used to indicate whether the terminal has a soft combination capability includes: the capability indication information is used to indicate whether the terminal has the soft combination capability on system bandwidth or an active bandwidth part BWP.

In a possible design, when the capability indication information is used to indicate that the terminal has the soft combination capability, the capability indication information includes frequency domain resource information, and the frequency domain resource information is used to indicate a frequency domain resource that supports the soft combination capability of the terminal.

According to a third aspect, a communications apparatus is provided, including a processor and a memory, where the memory is coupled to the processor, the memory stores instructions, and when the instructions are executed by the processor, the communications apparatus is enabled to perform the method for determining a TBS in any design of the first aspect. Optionally, the communications apparatus further includes a communications interface, where the communications interface is configured for communication between the communications apparatus and another device. For example, the communications interface may be a transceiver, a transceiver circuit, an input/output interface, an input/output circuit, or the like.

In an implementation, when the communications apparatus is a chip or a chip system, the processor may alternatively be a processing circuit or a logic circuit; the memory may be a storage circuit; and the communications interface may be an input/output interface, an interface circuit, an output circuit, an input circuit, a pin, a related circuit, or the like on the chip or the chip system.

According to a fourth aspect, a communications apparatus is provided, including a processor and a communications interface, where the processor is configured to execute computer instructions, so that the communications apparatus is enabled to implement the method for determining a TBS in any design of the first aspect. For example, the communications interface may be a transceiver, a transceiver circuit, an input/output interface, an input/output circuit, or the like.

In an implementation, when the communications apparatus is a chip or a chip system, the processor may alternatively be a processing circuit or a logic circuit; the memory may be a storage circuit; and the communications interface may be an input/output interface, an interface circuit, an output circuit, an input circuit, a pin, a related circuit, or the like on the chip or the chip system.

According to a fifth aspect, a computer-readable storage medium is provided, where the computer-readable storage medium stores instructions, and when the instructions are run on a computer, the computer is enabled to perform the method for determining a TBS in any design of the first aspect.

According to a sixth aspect, a computer program product including instructions is provided, where when the computer program product runs on a computer, the computer is enabled to perform the method for determining a TBS in any design of the first aspect.

According to a seventh aspect, a chip or a chip system is provided, where the chip or the chip system includes a processor, and when the processor executes instructions, the processor is configured to perform the method for determining a TBS in any design of the first aspect. The instructions may be from a memory inside the chip, or may be from a memory outside the chip. Optionally, the chip further includes an input/output circuit used as a communications interface.

According to an eighth aspect, a communications system is provided, including a plurality of network devices, where each of the plurality of network devices performs the method for determining a TBS in any one of the first aspect.

According to a ninth aspect, a method for determining a transport block size is provided, including: a first network device determines a transport block size TBS of a first transport block; the first network device sends a notification message to a second network device, where the notification message is used to indicate the TBS of the first transport block; and the second network device determines a TBS of a second transport block based on the TBS of the first transport block, where the first transport block is different from the second transport block, the TBS of the second transport block is equal to the TBS of the first transport block, and a data channel carrying the first transport block and a data channel carrying the second transport block occupy a same time domain resource.

For related descriptions of the first transport block and the second transport block, refer to the first aspect. Details are not described herein again.

According to a tenth aspect, a communications system is provided, including a plurality of network devices, where the plurality of network devices include a first network device and a second network device, and the second network device is another network device in the plurality of network devices except the first network device. The first network device is configured to: determine a TBS of a first transport block; and send a notification message to the second network device, where the notification message is used to indicate the TBS of the first transport block. The second network device is configured to: determine the TBS of the first transport block based on the notification message; and determine, based on the TBS of the first transport block, a TBS of a transport block that needs to be sent by the second network device.

For related descriptions of the first transport block and the second transport block, refer to the first aspect. Details are not described herein again.

BRIEF DESCRIPTION OF DRAWINGS

FIG. 1(*b*) is a schematic diagram of a joint transmission scenario according to an embodiment of this application;

DESCRIPTION OF EMBODIMENTS

Figure 1A:
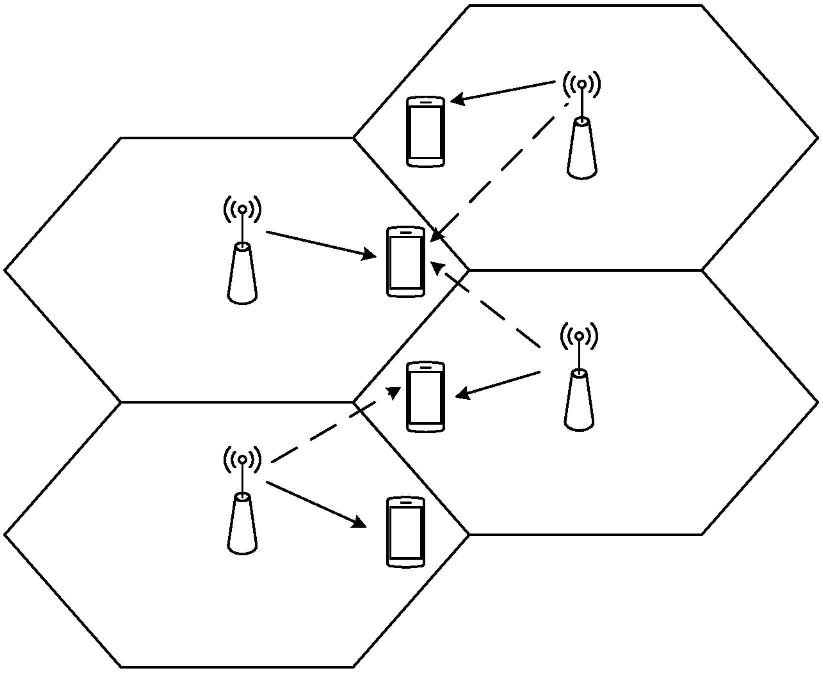
FIG. 1(*a*) is a schematic diagram of a non-joint transmission scenario according to an embodiment of this application.

In descriptions of this application, unless otherwise specified, "/" means "or". For example, A/B may represent A or B. "And/or" in this specification describes an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and terms such as "first" and "second" do not indicate a definite difference.

It should be noted that, in this application, terms such as "example" or "for example" are used to represent giving an example, an illustration, or descriptions. Any embodiment or design scheme described as an "example" or "for example" in this application should not be explained as being more preferred or having more advantages than another embodiment or design scheme. Specifically, use of the terms such as "example" or "for example" is intended to present a relative concept in a specific manner.

In descriptions of this application, the "indication" may include a direct indication and an indirect indication, or may include an explicit indication and an implicit indication. Information indicated by a piece of information (capability indication information described below) is referred to as to-be-indicated information. In a specific implementation process, there are a plurality of manners of indicating the to-be-indicated information. For example, the to-be-indicated information may be directly indicated, where the to-be-indicated information itself, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may alternatively be indicated by using a pre-agreed (for example, stipulated in a protocol) arrangement sequence of various pieces of information, to reduce indication overheads to some extent.

To facilitate understanding of technical solutions in this application, the following first briefly describes terms in this application.

1. Multipoint Transmission Technology

A multipoint transmission technology is a technology in which a plurality of TRPs transmit data. In the multipoint transmission technology, the plurality of TRPs may cooperatively send a downlink signal to a user, and/or cooperatively receive an uplink signal of a user.

The multipoint transmission technology mainly includes joint transmission (joint transmission, JT), dynamic point selection (dynamic point selection, DPS for short), dynamic cell selection (dynamic cell selection, DCS), and coordinated beamforming (coordinated beamforming, CB for short), coordinated scheduling (coordinated scheduling, CS), and the like.

Figure 1B:
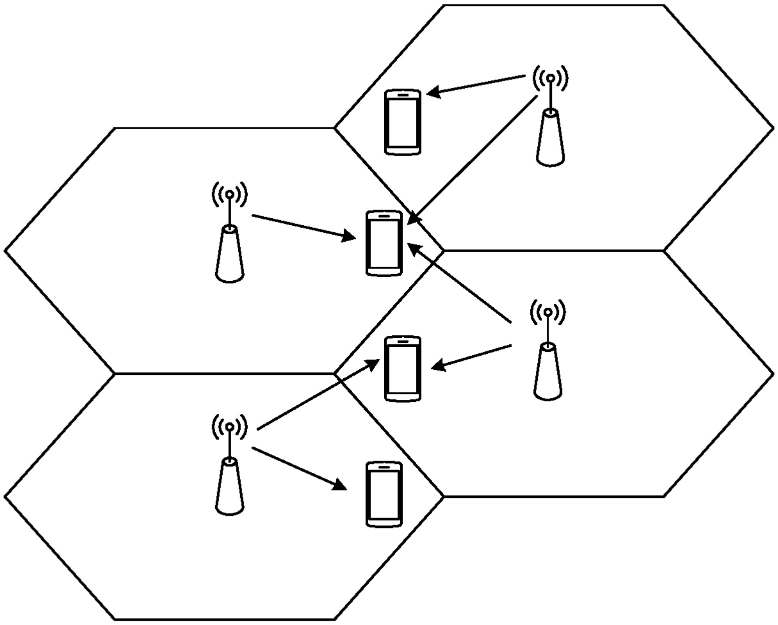

Multipoint transmission in this application is mainly a joint transmission (or referred to as coordinated multipoint transmission) scenario. A transmission rate of a terminal at a cell edge can be increased through joint transmission of the plurality of TRPs. For example, for a non-joint transmission scenario, refer to FIG. 1(*a*). When a terminal is at an edge of a cell, communication of the terminal is interfered by a signal sent by a neighboring cell of a serving cell. In FIG. 1(*a*), solid lines represent useful data generated for the terminal, and dashed lines represent interference caused to the terminal. For a joint transmission scenario, refer to FIG. 1(*b*). A plurality of TRPs jointly send data to one terminal, and the terminal receives a plurality of pieces of useful data. Therefore, a signal sent by a neighboring cell of a serving cell does not cause interference to the terminal, but on the contrary may increase a transmission rate of the terminal located at an edge of a cell.

It should be noted that, in a coordinated multipoint transmission scenario, a plurality of TRPs may respectively send different parts of a same copy of data; or the plurality of TRPs may send same data.

2. TCI State

A TCI state is used to indicate QCL information between different physical signals and/or physical channels. For example, the TCI state may be used to indicate QCL information between the CSI-RS and a demodulation reference signal (demodulation reference signal, DMRS).

For example, an information element format of the TCI state is shown as follows:

```
TCI-State ::=          SEQUENCE {
   tci-StateId            TCI-StateId,
   qcl-Type1                QCL-Info,
   qcl-Type2                   QCL-Info        OPTIONAL, --
Need R
   ...
}
QCL-Info ::=        SEQUENCE{
   cell                ServCellIndex        OPTIONAL, -- Need R
   bwp-Id                  BWP-Id              OPTIONAL, -- Cond CSI-
RS-Indicat
   referenceSignal            CHOICE {
      csi-rs                    NZP-CSI-RS-ResourceId,
      ssb                          SSB-Index
   },
   qcl-Type            ENUMERATED {typeA, typeB, typeC, typeD},
   ...
}
```

The cell field is used to indicate a serving cell on which a reference signal indicated by the QCL-info is configured.

The bwp-Id field is used to indicate a downlink BWP that carries the reference signal indicated by the QCL-info.

The ReferenceSignal field is used to configure a type and a serial number of a reference signal resource.

The qcl-Type field is used to indicate a QCL type corresponding to the reference signal indicated by the QCL-info.

3. MCS

An MCS is used to indicate a modulation scheme and a coding scheme. Specifically, each index value of the MCS corresponds to one modulation and coding strategy.

Currently, a correspondence between an MCS index, a modulation order, a bit rate, and spectral efficiency is defined in a standard. Refer to Table 1(a) to Table 1(c). It should be noted that, in different MCS tables, reserved MCS indexes are different. In Table 1(a), when the MCS index is 29, 30, or 31, the bit rate and the spectral efficiency are reserved (reserved). In Table 1(b), when the MCS index is 28, 29, 30, or 31, the bit rate and the spectral efficiency are reserved. In Table 1(c), when the MCS index is 29, 30, or 31, the bit rate and the spectral efficiency are reserved.

TABLE 1(a)

| MCS index | Modulation order | Bit rate × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 1(b)

| MCS index | Modulation order | Bit rate × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 1(c)

| MCS index | Modulation order | Bit rate × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

4. RV

Data into which the transport block is channel coded includes three segments, the first segment may be considered as a system bit, and the remaining two segments are redundant bits. The three segments of data are sequentially placed in a ring buffer shown in FIG. 2. The RV is used to determine a start location of an output sequence of the transport block that has undergone channel coding. Currently, the standard defines four RVs: RV0, RV1, RV2, and RV3. In descriptions of the embodiments of this application, "RVx" indicates an RV whose index is "x", where x is an integer greater than or equal to 0 and less than or equal to 3. "Same RVs" indicates RVs with a same index, and "different RVs" indicates RVs with different indexes. It may be understood that the index of the RV may have another name, for example, a version number or an identifier. This application is not limited thereto.

It should be noted that a location indicated by the RV0 is a start location of the ring buffer.

A transport block of the RV0 includes all system bits. However, transport blocks of other RVs can include all system bits only when the bit rate is less than a threshold. Therefore, generally, a transport block of an RV with a lower version number includes more system bits.

5. Rate Matching (Rate Matching)

Rate matching means that bits on a transport channel are repeated (repeated) or punctured (punctured) to match a carrying capability of a physical channel.

A rate matching manner includes puncturing and repeating. It should be noted that, if a quantity of input bits is smaller than a quantity of output bits, the rate matching manner should be repeating. If a quantity of input bits is larger than a quantity of output bits, the rate matching manner should be puncturing.

The puncturing means that a transmit end selects and deletes a part of raw coded bits. For a receive end, during decoding, the receive end processes a bit corresponding to a punctured location as an unknown bit, that is, sets a log-likelihood ratio (log-likelihood ratio, LLR) of the bit corresponding to the punctured location to 0.

The repeating means that the transmit end repeatedly sends raw coded bits in a specific order until a target code length is reached.

The rate matching includes a bit extraction process. Bits are extracted from corresponding locations based on a quantity of bits that need to be sent. If the quantity of bits that need to be sent is smaller than a quantity of bits that can be actually carried, data (a modulation symbol) may not be mapped to some resources. In other words, information mapping is performed by bypassing some resources.

6. Transport Block (Transport Block, TB)

A transport block is a basic unit for data exchange between a media access control (Media Access Control, MAC) sublayer for physical layer processing and a physical layer. In other words, a transport block is a data block including a MAC protocol data unit (Protocol Data Unit, PDU).

A TBS is a quantity of bits included in a transport block. The bits herein refer to useful bits.

The following describes a TBS calculation procedure. For specific details of the TBS calculation procedure, refer to related descriptions of the 3rd generation partnership project (3rd generation partnership project, 3GPP) technical specification (technical specification, TS) 38.214.

(1) A communications apparatus first determines a quantity $$N'_{RE}$$

of resource elements (resource element, RE) allocated to a physical downlink shared channel (physical downlink shared channel, PDSCH) within a physical resource block (physical resource block, PRB), where $$N'_{RE} = N_S^{RB} \cdot N_{symb}^{sh} - N_{DMRS}^{PRB} - N_{oh}^{PRB} \cdot N_{SC}^{RB}$$

represents a quantity of subcarriers in an RB.

$$N_{symb}^{sh}$$

represents a quantity of symbols allocated to the PDSCH within a slot.

$$N_{DMRS}^{PRB}$$

represents a quantity of REs for DMRS per RB in predetermined duration.

$$N_{oh}^{PRB}$$

represents an overhead configured by a parameter xOverhead in physical downlink shared channel-serving cell configuration (PDSCH-ServingCellConfig). It should be noted that if the parameter xOverhead in the PDSCH-ServingCellConfig is not configured, $$N_{oh}^{PRB}$$

is assumed to be 0.

Subsequently, the communications apparatus further determines a total quantity $N_{RE}$ of REs allocated to the PDSCH, where $$N_{RE} = \min(156, N'_{RE}) \cdot n_{PRB}.\ n_{PRB}$$

represents a total quantity of allocated PRBs.

(2) The communications apparatus determines an intermediate quantity of information bits (intermediate number of information bits), where $N_{info}=N_{RE}\cdot R\cdot Q_m\cdot v$. $N_{info}$ represents the intermediate quantity of information bits. R represents a bit rate. $Q_m$ represents a modulation order. v represents a quantity of transport layers.

If $N_{info}\le 3824$, the following step (3) is performed to determine a TBS. Otherwise, the following step (4) is performed to determine a TBS.

(3) When $N_{info}\le 3824$, a manner of determining a TBS is as follows:

The communications apparatus first determines a quantized intermediate quantity $$N'_{info}$$

of information bits, where $$N'_{info} = \max\left(24, 2^n \cdot \left\lfloor \frac{N_{info}}{2^n} \right\rfloor\right),$$

and $$n = \max(3, \lfloor \log_2(N_{info}) - 6 \rfloor).$$

Subsequently, the communications apparatus looks up Table 2 to determine a TBS that is closest to $$N'_{info}$$

and not less than $$N'_{info}.$$

TABLE 2

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

(4) When $N_{info}$>3824, a manner of determining a TBS is as follows:

The communications apparatus first determines a quantized intermediate quantity $$N'_{info}$$

of information bits, where $$N'_{info} = \max\left(3840,\ 2^n \times \text{round}\left(\frac{N_{info} - 24}{2^n}\right)\right),$$

$$n = \lfloor \log_2(N_{info} - 24) \rfloor - 5,$$

and round represents a circular function.

$$\text{If } R \le \frac{1}{4},$$

$$TBS = 8 \cdot C \cdot \left\lceil \frac{N'_{info} + 24}{8 \cdot C} \right\rceil - 24,$$

where $$C = \left\lceil \frac{N'_{info} + 24}{3816} \right\rceil.$$

$$\text{If } R > \frac{1}{4}$$

and $$N'_{info} > 8424,$$

$$TBS = 8 \cdot C \cdot \left\lceil \frac{N'_{info} + 24}{8 \cdot C} \right\rceil - 24,$$

where $$C = \left\lceil \frac{N'_{info} + 24}{8424} \right\rceil.$$

$$\text{If } R > \frac{1}{4}$$

and $$N'_{info} \le 8424,$$

$$TBS = 8 \cdot \left\lceil \frac{N'_{info} + 24}{8} \right\rceil - 24.$$

The foregoing describes terms used in the embodiments of this application, and details are not described below again.

Currently, a plurality of TRPs may simultaneously send transport blocks to a terminal, and the transport blocks sent by the plurality of TRPs come from a same copy of data. Therefore, the terminal can combine and demodulate the plurality of transport blocks, to obtain a relatively large combination gain, thereby ensuring robustness of data transmission.

However, a prerequisite that the terminal can combine and demodulate a plurality of transport blocks is that the plurality of transport blocks have a same TBS. For some reasons, for example, a quantity of time-frequency elements corresponding to different transport blocks varies. Therefore, different transport blocks may have different TBSs. As a result, the terminal part can combine and demodulate the plurality of transport blocks, and therefore robustness of data transmission cannot be ensured.

To resolve this problem, the embodiments of this application provide a method for determining a transport block size and an apparatus. For specific content of the method and the apparatus, refer to the following.

The technical solutions provided in the embodiments of this application may be applied to various communications systems, for example, a new radio (new radio, NR) communications system using a 5th generation (5th generation, 5G) communication technology, a future evolved system, or a plurality of convergent communications systems. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra-reliable low-latency communication, URLLC), and massive machine-type communications (massive machine-type communications, mMTC).

Figure 3:
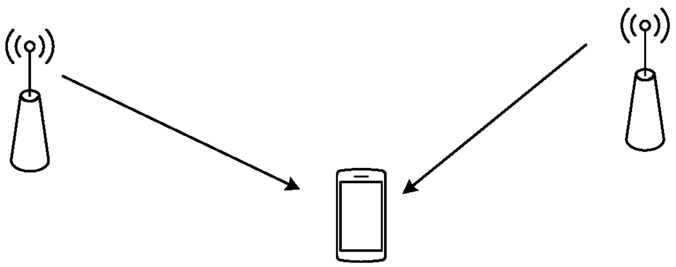
FIG. 3 is a schematic diagram of an architecture of a communications system according to an embodiment of this application.

FIG. 3 is a schematic diagram of an architecture of a communications system according to an embodiment of this application. The communications system may include one or more TRPs (only two are shown in FIG. 3) and one or more terminals (only one is shown in FIG. 3). The terminal may communicate with only one TRP. Alternatively, the terminal may simultaneously communicate with a plurality of TRPs.

It should be noted that the plurality of TRPs in coordinated transmission may be a plurality of network devices, or may be a plurality of antenna panels (panels) of a same network device. This is not limited in the embodiments of this application.

The network device may be a base station, a base station controller, or the like in wireless communication. The base station may include various types of base stations, such as a micro base station (also referred to as a small cell), a macro base station, a relay station, and an access point. This is not specifically limited in the embodiments of this application. In the embodiments of this application, the base station may be a base transceiver station (base transceiver station, BTS) in a global system for mobile communications (global system for mobile communications, GSM) or code division multiple access (code division multiple access, CDMA), a NodeB (NodeB) in wideband code division multiple access (wideband code division multiple access, WCDMA), an evolved NodeB (evolved NodeB, eNB or e-NodeB) in long term evolution (long term evolution, LTE), an eNB in the internet of things (internet of things, IoT) or the narrowband internet of things (narrowband internet of things, NB-IoT), or a base station in a future 5G mobile communications network or a future evolved public land mobile network (public land mobile network, PLMN). This is not limited in the embodiments of this application. In the embodiments of this application, an apparatus configured to implement a function of the network device may be a network device, or may be an apparatus, for example, a chip system, that can support the network device in implementing the function. In the embodiments of this application, an example in which the apparatus configured to implement the function of the network device is the network device is used to describe the technical solutions provided in the embodiments of this application.

The network device described in this application, for example, the base station, usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On the one hand, a distributed base station greatly shortens a length of the feeder between the RRU and the antenna, to reduce a signal loss, and reduce costs of the feeder. On the other hand, the RRU and the antenna are relatively small and can be installed anywhere, making network planning more flexible. The RRU may be remotely placed. In addition, all BBUs may be centralized and placed in a central office (central office, CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (distributed unit, DU). The base station may further include an active antenna unit (active antenna unit, AAU). The CU implements some functions of the base station, and the DU implements some functions of the base station. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some processing functions of the physical layer, radio frequency processing, and a function related to an active antenna. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified as a network device in a RAN, or the CU may be classified as a network device in a core network (core network, CN). This is not limited herein.

The terminal is a device that has a wireless transceiver function. The terminal may be deployed on land, including an indoor or outdoor device, a handheld device, or a vehicle-mounted device; or may be deployed on a water surface (for example, on a ship); or may be deployed in air (for example, on an airplane, a balloon, or a satellite). The terminal may be user equipment (user equipment, UE). The UE includes a handheld device, a vehicle-mounted device, a wearable device, or a computing device that has a wireless communication function. For example, the UE may be a mobile phone (mobile phone), a tablet computer, or a computer having a wireless transceiver function. The terminal may alternatively be a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In the embodiments of this application, an apparatus configured to implement a function of the terminal may be a terminal, or may be an apparatus, for example, a chip system, that can support the terminal in implementing the function. In the embodiments of this application, the chip system may include a chip, or may include a chip and another discrete component. In the embodiments of this application, an example in which the apparatus configured to implement the function of the terminal is the terminal is used to describe the technical solutions provided in the embodiments of this application.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 4:
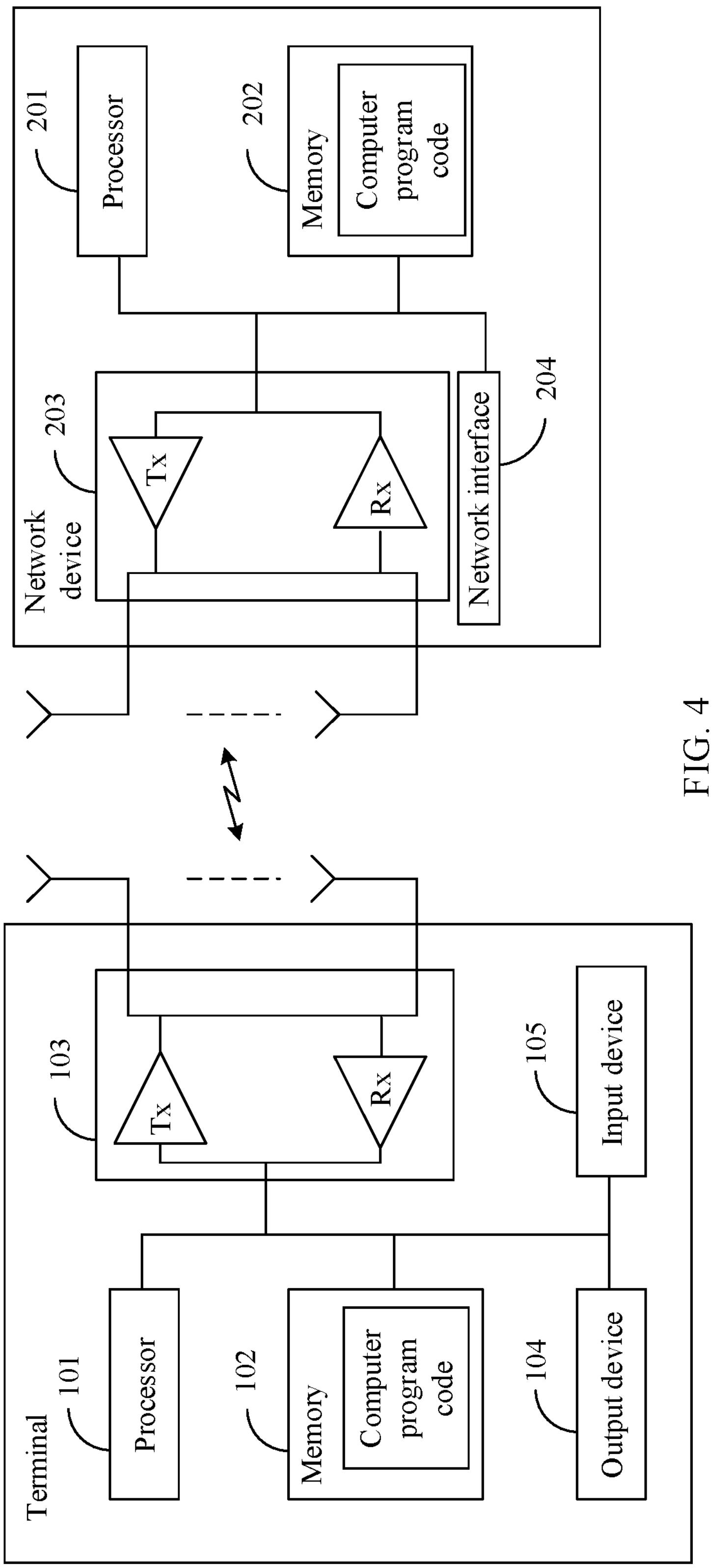
FIG. 4 is a schematic diagram of hardware structures of a terminal and a network device according to an embodiment of this application.

FIG. 4 is a schematic diagram of hardware structures of a network device and a terminal according to an embodiment of this application.

The terminal includes at least one processor 101 and at least one transceiver 103. Optionally, the terminal may further include an output device 104, an input device 105, and at least one memory 102.

The processor 101, the memory 102, and the transceiver 103 are connected through a bus. The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in this embodiment of this application. The memory 102 may exist independently, and is connected to the processor 101 through the bus. Alternatively, the memory 102 may be integrated with the processor 101. The memory 102 is configured to store application program code for performing the solutions in this application, and the processor 101 controls the execution. The processor 101 is configured to execute the computer program code stored in the memory 102, to implement the method provided in the embodiments of this application.

The transceiver 103 may use any apparatus such as a transceiver, and is configured to communicate with another device or a communications network such as the Ethernet, a radio access network (radio access network, RAN), or a wireless local area network (wireless local area networks, WLAN). The transceiver 103 includes a transmitter Tx and a receiver Rx.

The output device 104 communicates with the processor 101, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, or a projector (projector). The input device 105 communicates with the processor 101, and may receive an input of a user in a plurality of manners. For example, the input device 105 may be a mouse, a keyboard, a touchscreen device, or a sensor device.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to be connected to a core network device through a link (for example, an Si interface), or connected to a network interface of another network device through a wired or wireless link (for example, an X2 interface) (not shown in the figure). This is not specifically limited in this embodiment of this application. In addition, for related descriptions of the processor 201, the memory 202, and the transceiver 203, refer to the descriptions of the processor 101, the memory 102, and the transceiver 103 in the terminal. Details are not described herein again.

The following describes the technical solutions provided in this application in detail with reference to the accompanying drawings of this specification.

Figure 5:
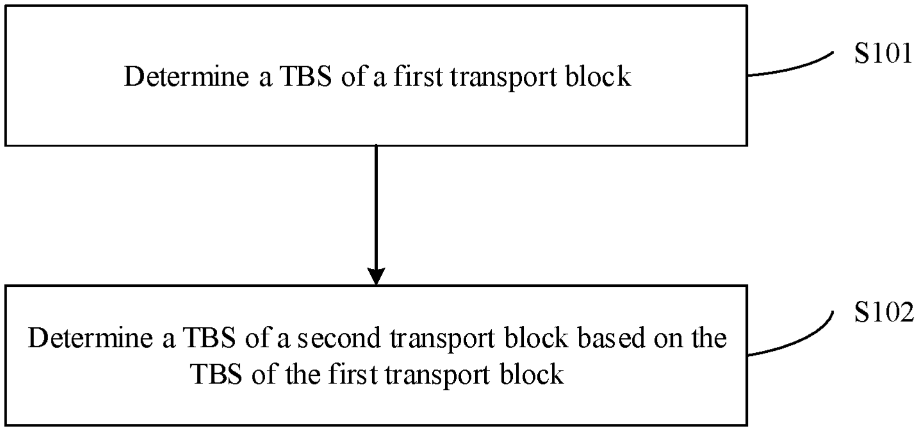
FIG. 5 is a flowchart of a method for determining a TBS according to an embodiment of this application.

A method for determining a TBS provided in the embodiments of this application is applied to a communications apparatus. The communications apparatus may be a network device or may be a terminal. As shown in FIG. 5, the method for determining a TBS includes the following steps.

S101: The communications apparatus determines a TBS of a first transport block.

The first transport block may be one transport block that meets a preset condition in a plurality of transport blocks.

In addition, for ease of description, another transport block in the plurality of transport blocks except the first transport block is referred to as a second transport block in the following. A unified description is provided herein, and details are not described below again.

It should be noted that a data channel carrying the first transport block and a data channel carrying the second transport block occupy a same time-frequency resource. It may be understood that the data channel carrying the first transport block and the data channel carrying the second transport block may be the same or different.

The data channel may be a PDSCH. A granularity of the time domain resource may be a slot, an OFDM symbol, a subframe, a mini-slot (mini-slot or sub-slot), or the like. The embodiments of this application are not limited thereto.

In other words, on one time-frequency resource, for a plurality of TRPs, each TRP may send one PDSCH to the terminal, and the PDSCH carries a transport block.

It should be noted that the plurality of transport blocks come from a same PDU. The plurality of transport blocks correspond to same data. In other words, the plurality of transport blocks correspond to a same system bit. Therefore, if the terminal may combine and demodulate a plurality of transport blocks on a same time domain resource, the terminal may obtain a corresponding combination gain, thereby ensuring robustness of data transmission.

Optionally, the preset condition includes at least one of the following:

(1) Among the plurality of transport blocks, a quantity of time-frequency elements corresponding to the first transport block is the smallest. The time-frequency element may be an RE.

In other words, the quantity of time-frequency elements corresponding to the first transport block is smaller than a quantity of time-frequency elements corresponding to the second transport block.

In this embodiment of this application, a quantity of time-frequency elements corresponding to each of the plurality of transport blocks may be $N_{RE}$. For a method for determining $N_{RE}$, refer to the foregoing descriptions, and details are not described herein again.

For example, a quantity of time-frequency elements corresponding to a transport block #1 is 120, a quantity of time-frequency elements corresponding to a transport block #2 is 100, and a quantity of time-frequency elements corresponding to a transport block #3 is 90. In this way, among the transport block #1, the transport block #2, and the transport block #3, the transport block #3 is used as the first transport block.

(2) Among the plurality of transport blocks, a quantity of time-frequency elements corresponding to the first transport block is the largest.

In other words, the quantity of time-frequency elements corresponding to the first transport block is larger than a quantity of time-frequency elements corresponding to the second transport block.

For example, a quantity of time-frequency elements corresponding to a transport block #1 is 120, a quantity of time-frequency elements corresponding to a transport block #2 is 100, and a quantity of time-frequency elements corresponding to a transport block #3 is 90. In this way, among the transport block #1, the transport block #2, and the transport block #3, the transport block #1 is used as the first transport block.

(3) Among the plurality of transport blocks, an index value of a TCI state associated with a data channel carrying the first transport block is the smallest.

In other words, the index value of the TCI state associated with the data channel carrying the first transport block is smaller than a TCI state associated with a data channel carrying the second transport block.

For example, a data channel carrying a transport block #1 is associated with a TCI state #5, a data channel carrying a transport block #2 is associated with a TCI state #7, and a data channel carrying a transport block #3 is associated with a TCI state #1. In this way, among the transport block #1, the transport block #2, and the transport block #3, the transport block #3 is used as the first transport block.

Optionally, the index value of the TCI state may be a serial number of the TCI state in a sorted sequence. Therefore, a smaller index value of a TCI state indicates a more forward location of the TCI state in a sorted sequence of a plurality of TCI states.

For example, one DCI indicates one group of TCI states, and one group of TCI states includes two TCI states. Therefore, the TCI state associated with the data channel carrying the first transport block is the 1st TCI state in the group of TCI states, and the TCI state associated with the data channel carrying the second transport block is the 2nd TCI state in the group of TCI states.

(4) Among the plurality of transport blocks, an index value of a TCI state associated with a data channel carrying the first transport block is the largest.

In other words, the index value of the TCI state associated with the data channel carrying the first transport block is larger than a TCI state associated with a data channel carrying the second transport block.

For example, a data channel carrying a transport block #1 is associated with a TCI state #5, a data channel carrying a transport block #2 is associated with a TCI state #7, and a data channel carrying a transport block #3 is associated with a TCI state #1. In this way, among the transport block #1, the transport block #2, and the transport block #3, the transport block #2 is used as the first transport block.

Optionally, the index value of the TCI state may be a serial number of the TCI state in a sorted sequence. Therefore, a smaller index value of a TCI state indicates a more forward location of the TCI state in a sorted sequence of a plurality of TCI states.

For example, one DCI indicates one group of TCI states, and one group of TCI states includes two TCI states. Therefore, the TCI state associated with the data channel carrying the first transport block is the $2^{nd}$ TCI state in the group of TCI states, and the TCI state associated with the data channel carrying the second transport block is the $1^{st}$ TCI state in the group of TCI states.

It may be understood that the foregoing condition (3) or condition (4) is applicable to a case in which the data channel carrying the first transport block and the data channel carrying the second transport block are different.

(5) Among the plurality of transport blocks, a frequency of a frequency domain resource occupied by the first transport block is the highest.

In other words, the frequency of the frequency domain resource occupied by the first transport block is higher than a frequency of a frequency domain resource occupied by the second transport block.

In a possible design, the plurality of transport blocks are sorted in descending order of frequencies of occupied frequency domain resources, and a sorting serial number of the first transport block is smaller than a sorting serial number of the second transport block. Alternatively, the plurality of transport blocks are sorted in ascending order of frequencies of occupied frequency domain resources, and a sorting serial number of the first transport block is larger than a sorting serial number of the second transport block.

(6) Among the plurality of transport blocks, a frequency of a frequency resource occupied by the first transport block is the lowest.

In other words, the frequency of the frequency domain resource occupied by the first transport block is lower than a frequency of a frequency domain resource occupied by the second transport block.

In a possible design, the plurality of transport blocks are sorted in descending order of frequencies of occupied frequency domain resources, and a sorting serial number of the first transport block is larger than a sorting serial number of the second transport block. Alternatively, the plurality of transport blocks are sorted in ascending order of frequencies of occupied frequency domain resources, and a sorting serial number of the first transport block is smaller than a sorting serial number of the second transport block.

(7) Among the plurality of transport blocks, the first transport block corresponds to a target RV.

The target RV may be any one of RV0, RV1, RV2, and RV3. For example, the target RV is the RV0.

The condition (1) to the condition (7) are merely examples of the preset condition, and do not constitute a limitation on the preset condition.

Optionally, step S101 may include the following two implementations:

Implementation 1: The communications apparatus receives a notification message from another communications apparatus, where the notification message is used to indicate the TBS of the first transport block. Therefore, the communications apparatus determines the TBS of the first transport block based on the notification message.

Optionally, Implementation 1 is mainly applied to a case in which the communications apparatus is a network device. For example, a network device 1 and a network device 2 participate in coordinated transmission. The network device 1 sends a transport block #1 and the network device 2 sends a transport block #2. An example in which the transport block #1 is the first transport block is used. After determining a TBS corresponding to the transport block #1, the network device 1 sends a notification message to the network device 2, so that the network device 2 learns of the TBS corresponding to the transport block #1.

Implementation 2: The communications apparatus determines the TBS of the first transport block based on a configuration parameter of the first transport block. The configuration parameter of the first transport block includes a bit rate corresponding to the first transport block, an MCS corresponding to the first transport block, and a time-frequency resource corresponding to the first transport block. The time-frequency resource corresponding to the first transport block may be used to determine the quantity of time-frequency elements corresponding to the first transport block.

It may be understood that, for the process of calculating the TBS of the first transport block, refer to the foregoing descriptions. Details are not described herein again.

For the terminal, the configuration parameter of the first transport block is carried in DCI for scheduling the first transport block. To be specific, the terminal receives the DCI for scheduling the first transport block. Then, the terminal may determine the configuration parameter of the first transport block based on the DCI.

For the network device, the configuration parameter of the first transport block is generated by the network device, or is obtained by the network device from another network device.

S102: The communications apparatus determines a TBS of the second transport block based on the TBS of the first transport block.

The TBS of the second transport block is equal to the TBS of the first transport block.

For example, assuming that the TBS of the first transport block is 336, the TBS of the second transport block is also 336.

For ease of description, a TBS calculated based on the configuration parameter of the first transport block is referred to as a first TBS, and a TBS calculated based on a configuration parameter of the second transport block is referred to as a second TBS in the following.

The first TBS may be not equal to the second TBS. Therefore, to enable the TBS of the second transport block to be the first TBS, the communications apparatus may adjust a bit rate corresponding to the second transport block. To be specific, in a process of modulating/demodulating the second transport block by the communications apparatus, a bit rate actually used by the communications apparatus (that is, the bit rate corresponding to the second transport block) may be determined based on the TBS of the first transport block, the quantity of time-frequency elements corresponding to the second transport block, and an MCS corresponding to the second transport block.

In this embodiment of this application, when the TBS of the second transport block is set to the first TBS, a quantity of information bits corresponding to the second transport block is in the following two cases:

Case 1: The quantity of information bits corresponding to the second transport block is equal to a quantity of information bits corresponding to the first transport block.

The information bit may be an intermediate information bit or a quantized intermediate information bit.

It may be understood that, when the quantity of information bits corresponding to the second transport block may be equal to the quantity of information bits corresponding to the first transport block, the TBS of the second transport block is necessarily equal to the TBS of the first transport block. In other words, both the TBS corresponding to the first transport block and the TBS of the second transport block may be the first TBS.

Based on Case 1, in the first transport block and the second transport block, a rate matching manner corresponding to a transport block with a larger quantity of time-frequency elements is repeating, and/or a rate matching manner corresponding to a transport block with a smaller quantity of time-frequency elements is puncturing.

For example, if the quantity of time-frequency elements corresponding to the first transport block is smaller than the quantity of time-frequency elements corresponding to the second transport block, a rate matching manner corresponding to the first transport block is puncturing, and/or a rate matching manner corresponding to the second transport block is repeating.

For another example, if the quantity of time-frequency elements corresponding to the first transport block is larger than the quantity of time-frequency elements corresponding to the second transport block, a rate matching manner corresponding to the first transport block is repeating, and/or a rate matching manner corresponding to the second transport block is puncturing.

It may be understood that repeating may be replaced with zero padding. The zero padding means adding zeros after raw coded bits until a target code length is reached.

Based on Case 1, if the quantity of time-frequency elements corresponding to the first transport block is equal to the quantity of time-frequency elements corresponding to the second transport block, the rate matching manner corresponding to the first transport block may be the same as the rate matching manner corresponding to the second transport block.

Case 2: The quantity of information bits corresponding to the second transport block is not equal to a quantity of information bits corresponding to the first transport block.

It may be understood that, when the information bits corresponding to the second transport block are not equal to the information bits corresponding to the first transport block, the TBS of the second transport block may still be equal to the TBS of the first transport block. For example, it is assumed that quantized information bits corresponding to the first transport block are 1380, and the quantized information bits corresponding to the second transport block are 1400. It can be learned from Table 2 that both the TBS of the first transport block and the TBS of the second transport block are 1416.

Based on Case 2, in the first transport block and the second transport block, a transport block with a larger quantity of information bits corresponds to a first RV, and a transport block with a smaller quantity of information bits corresponds to a second RV.

For example, if the quantity of information bits corresponding to the first transport block is larger than the quantity of information bits corresponding to the second transport block, the first transport block corresponds to the first RV, and the second transport block corresponds to the second RV.

For another example, if the quantity of information bits corresponding to the first transport block is smaller than the quantity of information bits corresponding to the second transport block, the first transport block corresponds to the second RV, and the second transport block corresponds to the first RV.

Optionally, a version number of the first RV is larger than a version number of the second RV. It may be understood that when the version number of the first RV is larger than the version number of the second RV, the first RV and the second RV may be in one of the following cases: (1) The second RV is the RV0 and the first RV is the RV1. (2) The second RV is the RV0 and the first RV is the RV2. (3) The second RV is the RV0 and the first RV is the RV3. (4) The second RV is the RV1 and the first RV is the RV2. (5) The second RV is the RV1 and the first RV is the RV3. (6) The second RV is the RV2 and the first RV is the RV3.

Optionally, a priority of the first RV is lower than that of the second RV. For example, a sorted sequence of priorities of the RVs from low to high may be: the RV3, the RV2, the RV1, and the RV0. Alternatively, a sorted sequence of priorities of the RVs from low to high may be the RV2, the RV3, the RV1, and the RV0.

Figure 2:
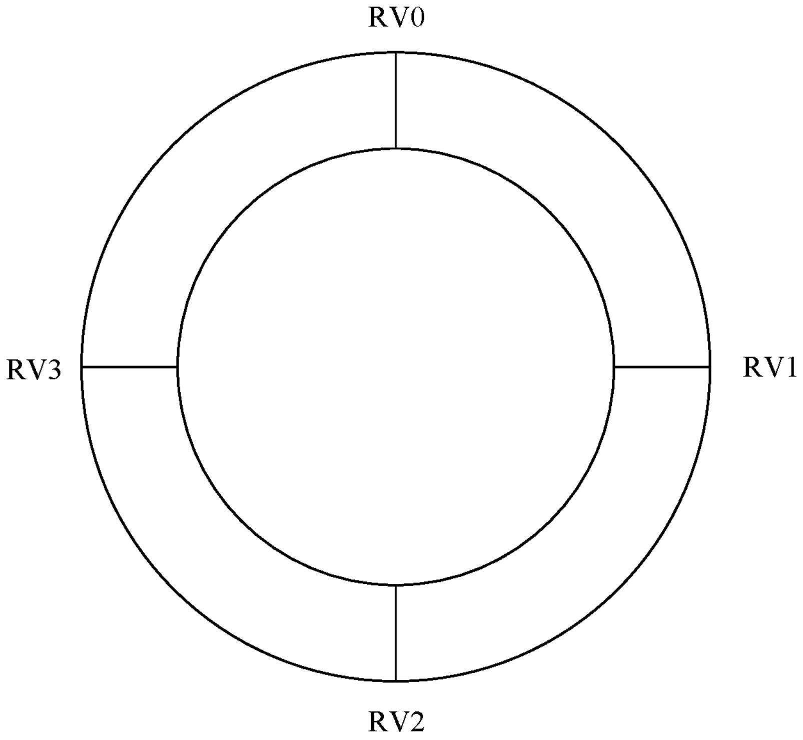
FIG. 2 is a schematic diagram of a ring buffer according to an embodiment of this application.

Refer to FIG. 2. It may be understood that, because the system bits include useful information, the transport block should carry system bits as many as possible. When a quantity of information bits is relatively small, if a redundancy version (for example, the RV0) corresponding to a transport block has a relatively low version number, the transport block may carry system bits as many as possible.

Therefore, in the first transport block and the second transport block, a transport block with a larger quantity of information bits corresponds to the first RV, and a transport block with a smaller quantity of information bits corresponds to the second RV. In this way, the terminal may receive more system bits by receiving the first transport block and the second transport block.

Based on the technical solution shown in FIG. 5, the communications apparatus determines the TBS of the second transport block by using the TBS of the first transport block. Therefore, the TBS of the first transport block is equal to the TBS of the second transport block. This can ensure that the terminal can combine and demodulate the first transport block and the second transport block on a same time domain resource, to obtain a corresponding combination gain, thereby ensuring robustness of data transmission.

In this embodiment of this application, if the plurality of TRPs participating in the coordinated transmission belong to at least two network devices, each of the at least two network devices may perform the technical solution shown in FIG. 5, to determine a TBS of a transport block sent by each of the TRPs corresponding to the network device.

Figure 6:
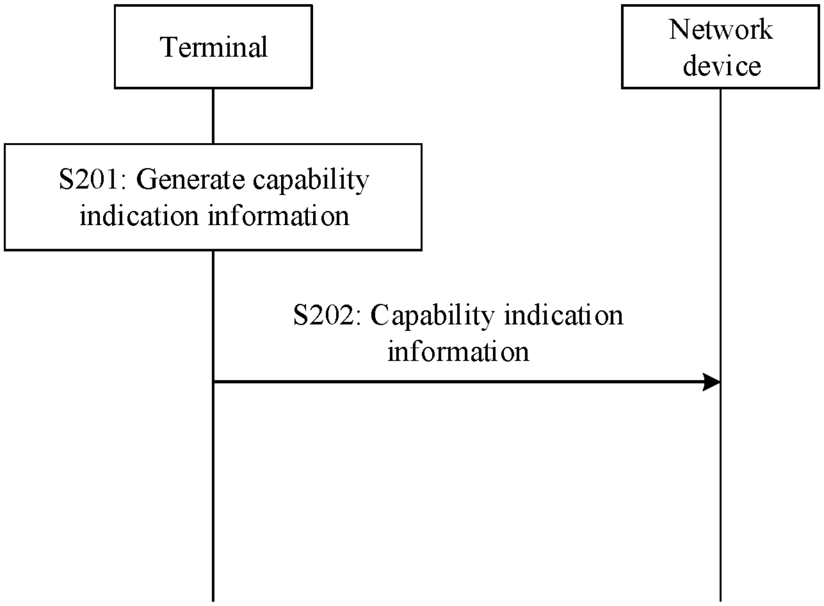
FIG. 6 is a flowchart of a capability reporting method according to an embodiment of this application.

The terminal can combine and demodulate a plurality of transport blocks on a same time domain resource only when the terminal has a soft combination capability. In other words, it is necessary to use a same TBS for a plurality of transport blocks only when the terminal has the soft combination capability. In other words, a prerequisite for implementing the technical solution shown in FIG. 5 is that the terminal has the soft combination capability. Therefore, a network side needs to know whether the terminal has the soft combination capability. Based on this, the embodiments of this application provide a capability reporting method. As shown in FIG. 6, the capability reporting method includes the following steps.

S201: A terminal generates capability indication information.

The capability indication information is used to indicate whether the terminal has a soft combination capability. The soft combination capability is a capability of combining and demodulating a plurality of pieces of data received on a same time domain resource. The foregoing plurality of pieces of data are a plurality of transport blocks.

In this embodiment of this application, the capability indication information includes at least the following two designs.

Design 1: The capability indication information is used to indicate whether the terminal has the soft combination capability on system bandwidth or an active BWP.

In other words, when the capability indication information is used to indicate that the terminal has the soft combination capability, it is considered by default that the terminal has the soft combination capability on the system bandwidth or the active BWP. When the capability indication information is used to indicate that the terminal does not have the soft combination capability, it is considered by default that the terminal does not have the soft combination capability on the system bandwidth or the active BWP.

The system bandwidth may also be referred to as a carrier frequency resource or a component carrier (component carrier, CC). The system bandwidth may be a segment of consecutive frequency domain resources.

The BWP may also be referred to as a carrier bandwidth part (carrier bandwidth part). In frequency domain, one BWP includes a positive integer quantity of consecutive resource elements, for example, includes a positive integer quantity of consecutive subcarriers, resource blocks (resource block, RB), or resource block groups (resource block group, RBG). In this embodiment of this application, the positive integer quantity may be one, two, three, or more. This is not limited in this embodiment of this application.

Based on Design 1, the capability indication information may be indicated in an explicit manner. For example, the capability indication information may be implemented by using one or more bits.

For example, the capability indication information is implemented by using one bit. A value of the bit being "0" is used to indicate that the terminal does not have the soft combination capability. A value of the bit being "1" is used to indicate that the terminal has the soft combination capability.

Based on Design 1, the capability indication information may be indicated in an implicit manner. For example, a type of the terminal is associated with whether the terminal has the soft combination capability. Therefore, the capability indication information may indirectly indicate whether the terminal has the soft combination capability by indicating the type of the terminal.

For example, a terminal of a type 1 has the soft combination capability and a terminal of a type 2 does not have the soft combination capability. In this way, if the capability indication information is used to indicate that the type of the terminal is the type 1, it means that the terminal has the soft combination capability; if the capability indication information is used to indicate that the type of the terminal is the type 2, it means that the terminal does not have the soft combination capability.

Design 2: The capability indication information is used to indicate whether the terminal has the soft combination capability on a target frequency domain resource.

Based on Design 2, the capability indication information should further include frequency domain resource information, and the frequency domain resource information is used to indicate the target frequency domain resource. The target frequency domain resource is a frequency domain resource that supports the soft combination capability of the terminal.

S202: The terminal sends the capability indication information to a network device, so that the network device receives the capability indication information.

The capability indication information may be carried in RRC signaling.

Optionally, the terminal may send the capability indication information to the network device in a registration procedure.

Based on the technical solution shown in FIG. 6, the terminal generates the capability indication information, and sends the capability indication information to the network device, so that the network device learns whether the terminal has the soft combination capability. Therefore, the network device may determine, based on whether the terminal has the soft combination capability, whether to use the technical solution shown in FIG. 5.

It may be understood that, if the terminal does not have the soft combination capability, the network device may not use the technical solution shown in FIG. 5. If the terminal has a soft combination capability, the network device may use the technical solution shown in FIG. 5.

It may be understood that the network device may consider by default that the terminal has the soft combination capability. Alternatively, the network device may consider by default that the terminal does not have the soft combination capability.

The foregoing mainly describes the solutions provided in the embodiments of this application from a perspective of interaction between network elements. It may be understood that, to implement the foregoing functions, each of network elements such as the network device and the terminal includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely a logical function division. In an actual implementation, another division manner may be used. An example in which each function module is obtained through division based on each corresponding function is used below for description.

Figure 7:
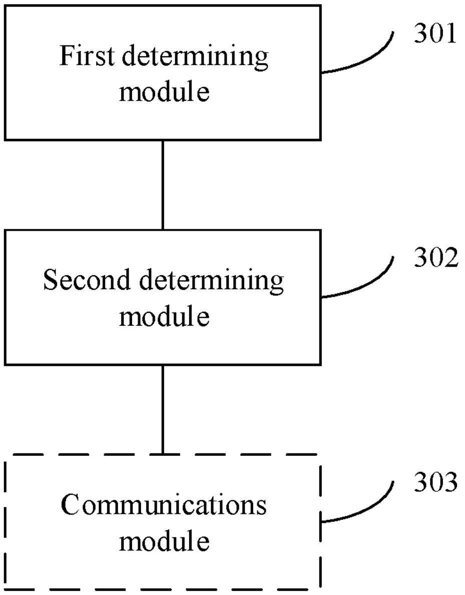
FIG. 7 is a schematic diagram of a structure of a communications apparatus according to an embodiment of this application.

FIG. 7 is a schematic diagram of a structure of a communications apparatus according to an embodiment of this application. As shown in FIG. 7, the communications apparatus includes a first determining module 301 and a second determining module 302. The first determining module 301 is configured to support the communications apparatus in performing step S101 shown in FIG. 5. The second determining module 302 is configured to support the communications apparatus in performing step S102 shown in FIG. 5.

It may be understood that the first determining module 301 and the second determining module 302 may be integrated into one module, for example, one processing module. Optionally, when the communications apparatus is a chip or a chip system, the first determining module 301 and the second determining module 302 may be a processing circuit or a logic circuit. The communications apparatus may further include a communications interface. The communications interface may be an input/output interface, an interface circuit, an output circuit, an input circuit, a pin, a related circuit, or the like on the chip or the chip system.

Optionally, as shown in FIG. 7, the communications apparatus may further include a communications module 303. The communications module 303 is configured to support the communications apparatus in performing step S202 shown in FIG. 6.

In an example, when the communications apparatus is a terminal, with reference to the terminal shown in FIG. 4, the communications module 303 in FIG. 7 may be implemented by the transceiver 103 in FIG. 4. The first determining module 301 and the second determining module 302 in FIG. 7 may be implemented by the processor 101 in FIG. 4. This is not limited in the embodiments of this application.

In an example, when the communications apparatus is a network device, with reference to the network device shown in FIG. 4, the communications module 303 in FIG. 7 may be implemented by the transceiver 203 in FIG. 4. The first determining module 301 and the second determining module 302 in FIG. 7 may be implemented by the processor 201 in FIG. 4. This is not limited in the embodiments of this application.

An embodiment of this application further provides a computer-readable storage medium. The computer-readable storage medium stores computer instructions, and when the computer-readable storage medium runs on a communications apparatus, the communications apparatus is enabled to perform the technical solutions provided in the embodiments of this application.

An embodiment of this application further provides a computer program product including computer instructions, and when the computer program product runs on a communications apparatus, the communications apparatus is enabled to perform the technical solutions provided in the embodiments of this application.

The communications apparatus, the computer storage medium, and the computer program product provided in the embodiments of this application are all configured to perform the methods provided above. Therefore, for beneficial effects that can be achieved by the communications apparatus, the computer storage medium, and the computer program product, refer to the beneficial effects corresponding to the methods provided above. Details are not described herein again.

Figure 8:
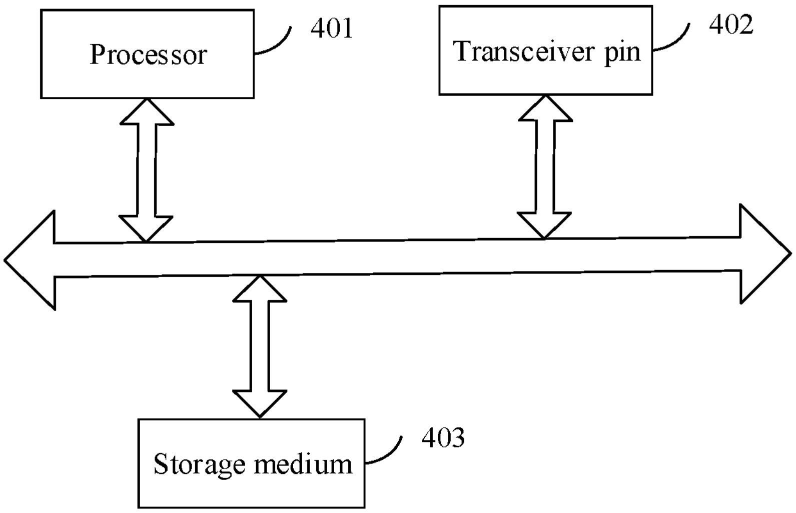
FIG. 8 is a schematic diagram of a structure of a chip according to an embodiment of this application.

FIG. 8 is a schematic diagram of a structure of a chip according to an embodiment of this application. The chip shown in FIG. 8 may be a general-purpose processor, or may be a dedicated processor. The chip includes a processor 401. The processor 401 is configured to support the communications apparatus in performing the technical solutions provided in the embodiments of this application.

Optionally, the chip further includes a transceiver pin 402. The transceiver pin 402 is configured to accept control of the processor 401, and is configured to support the communications apparatus in performing the technical solutions provided in the embodiments of this application.

Optionally, the chip shown in FIG. 8 may further include a storage medium 403.

It should be noted that the chip shown in FIG. 8 may be implemented by using the following circuit or component: one or more field programmable gate arrays (field programmable gate array, FPGA), a programmable logic device (programmable logic device, PLD), a controller, a state machine, gate logic, a discrete hardware component, any other appropriate circuit, or any combination of circuits that can perform various functions described in this application.

Although this application is described with reference to the embodiments herein, a person skilled in the art may understand and implement another variation of the disclosed embodiments by viewing the accompanying drawings, disclosed content, and the appended claims. In the claims, "comprising (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:

1. A method for determining a transport block size, wherein the method comprises:

determining, by a communications apparatus, a transport block size (TBS) of a first transport block; and determining, by the communications apparatus, a TBS of a second transport block based on the TBS of the first transport block, wherein the first transport block is different from the second transport block, the TBS of the second transport block is equal to the TBS of the first transport block, and a data channel carrying the first transport block and a data channel carrying the second transport block occupy a same time domain resource, wherein an index value of a transmission configuration indication state (TCI) state associated with the data channel carrying the first transport block is smaller than an index value of a TCI state associated with the data channel carrying the second transport block, and wherein a quantity of time-frequency elements corresponding to the first transport block is larger than a quantity of time-frequency elements corresponding to the second transport block;

wherein when the communications apparatus includes a first terminal, the first transport block is received from a first network device and the second transport block is received from a second network device; and wherein when the communications apparatus includes a first network device, the first transport block and the second transport block are transport blocks to be sent to a second terminal.

2. The method for determining a transport block size according to claim 1, wherein the first transport block and the second transport block correspond to different redundancy versions (RVs) of a same copy of data.

3. The method for determining a transport block size according to claim 1, wherein at least one of the following occurs:

a frequency of a frequency domain resource occupied by the first transport block is lower than a frequency of a frequency domain resource occupied by the second transport block; or the first transport block corresponds to a target RV.

4. The method for determining a transport block size according to claim 1, wherein at least one of the following occurs:

a frequency of a frequency domain resource occupied by the first transport block is higher than a frequency of a frequency domain resource occupied by the second transport block; or the first transport block corresponds to a target RV.

5. The method for determining a transport block size according to claim 1, wherein a bit rate corresponding to the second transport block is determined based on the TBS of the first transport block, a quantity of time-frequency elements of the second transport block, and a modulation and coding scheme (MCS) corresponding to the second transport block.

6. The method for determining a transport block size according to claim 1, wherein a quantity of information bits corresponding to the first transport block is equal to a quantity of information bits corresponding to the second transport block.

7. The method for determining a transport block size according to claim 6, wherein:

in response to determining that the quantity of time-frequency elements corresponding to the first transport block is smaller than the quantity of time-frequency elements corresponding to the second transport block, at least one of the following occurs:

a rate matching manner corresponding to the first transport block is puncturing; or a rate matching manner corresponding to the second transport block is repeating; or in response to determining that the quantity of time-frequency elements corresponding to the first transport block is larger than a quantity of time-frequency resources corresponding to the second transport block, at least one of the following occurs:

a rate matching manner corresponding to the first transport block is repeating; or a rate matching manner corresponding to the second transport block is puncturing.

8. The method for determining a transport block size according to claim 1, wherein the communications apparatus is the first terminal, and the method further comprises:

sending, by the first terminal, capability indication information to a second network device, wherein the capability indication information is used to indicate whether the first terminal has a soft combination capability, and the soft combination capability is a capability of combining and demodulating a plurality of pieces of data received on a same time domain resource.

9. A communications apparatus, comprising:

at least one processor, and one or more memories coupled to the at least one processor and storing programming instructions for execution by the at least one processor to perform operations comprising:

determining a transport block size (TBS) of a first transport block; and determining a TBS of a second transport block based on the TBS of the first transport block, wherein the first transport block is different from the second transport block, the TBS of the second transport block is equal to the TBS of the first transport block, and a data channel carrying the first transport block and a data channel carrying the second transport block occupy a same time domain resource, wherein an index value of a transmission configuration indication state (TCI) state associated with the data channel carrying the first transport block is smaller than an index value of a TCI state associated with the data channel carrying the second transport block, and wherein a quantity of time-frequency elements corresponding to the first transport block is larger than a quantity of time-frequency elements corresponding to the second transport block;

wherein when the communications apparatus includes a first terminal, the first transport block is received from a first network device and the second transport block is received from a second network device; and wherein when the communications apparatus includes a first network device, the first transport block and the second transport block are transport blocks to be sent to a second terminal.

10. The communications apparatus according to claim 9, wherein the first transport block and the second transport block correspond to different redundancy versions (RVs) of a same copy of data.

11. The communications apparatus according to claim 9, wherein at least one of the following occurs:

a frequency of a frequency domain resource occupied by the first transport block is lower than a frequency of a frequency domain resource occupied by the second transport block; or the first transport block corresponds to a target RV.

12. The communications apparatus according to claim 9, wherein at least one of the following occurs:

a frequency of a frequency domain resource occupied by the first transport block is higher than a frequency of a frequency domain resource occupied by the second transport block; or the first transport block corresponds to a target RV.

13. The communications apparatus according to claim 9, wherein a bit rate corresponding to the second transport block is determined based on the TBS of the first transport block, a quantity of time-frequency elements of the second transport block, and a modulation and coding scheme (MCS) corresponding to the second transport block.

14. The communications apparatus according to claim 9, wherein a quantity of information bits corresponding to the first transport block is equal to a quantity of information bits corresponding to the second transport block.

15. The communications apparatus according to claim 14, wherein:

in response to determining that the quantity of time-frequency elements corresponding to the first transport block is smaller than the quantity of time-frequency elements corresponding to the second transport block, at least one of the following occurs:

a rate matching manner corresponding to the first transport block is puncturing; or a rate matching manner corresponding to the second transport block is repeating; or in response to determining that the quantity of time-frequency elements corresponding to the first transport block is larger than a quantity of time-frequency resources corresponding to the second transport block, at least one of the following occurs:

a rate matching manner corresponding to the first transport block is repeating; or a rate matching manner corresponding to the second transport block is puncturing.

16. The communications apparatus according to claim 9, wherein the communication apparatus is the first terminal, and wherein the operations comprise:

sending capability indication information to a second network device, wherein the capability indication information is used to indicate whether the first terminal has a soft combination capability, and the soft combination capability is a capability of combining and demodulating a plurality of pieces of data received on a same time domain resource.

17. A communications system, comprising a plurality of network devices, wherein the plurality of network devices comprise a first network device and a second network device, and the second network device is different from the first network device, and wherein:

the first network device is configured to:

determine a transport block size (TBS) of a first transport block; and send a notification message to the second network device, wherein the notification message is used to indicate the TBS of the first transport block; and the second network device is configured to:

receive the notification message; and determine a TBS of a second transport block based on the TBS of the first transport block, wherein the first transport block is different from the second transport block, the TBS of the second transport block is equal to the TBS of the first transport block, and a data channel carrying the first transport block and a data channel carrying the second transport block occupy a same time domain resource, wherein an index value of a transmission configuration indication state (TCI) state associated with the data channel carrying the first transport block is smaller than an index value of a TCI state associated with the data channel carrying the second transport block, and wherein a quantity of time-frequency elements corresponding to the first transport block is larger than a quantity of time-frequency elements corresponding to the second transport block; and the first transport block and the second transport block are transport blocks to be sent to a terminal.

18. The communication system according to claim 17, wherein the first transport block and the second transport block correspond to different redundancy versions (RVs) of a same copy of data.

19. The communication system according to claim 17, wherein at least one of the following occurs:

a frequency of a frequency domain resource occupied by the first transport block is lower than a frequency of a frequency domain resource occupied by the second transport block; or the first transport block corresponds to a target RV.

20. The communication system according to claim 17, wherein at least one of the following occurs:

a frequency of a frequency domain resource occupied by the first transport block is higher than a frequency of a frequency domain resource occupied by the second transport block; or the first transport block corresponds to a target RV.

* * * * *